United States Patent [19]
Gundacker et al.

[11] 3,937,920
[45] Feb. 10, 1976

[54] METHOD OF OPERATING AN ELECTRODE-TYPE WATER-VAPOR GENERATOR

[75] Inventors: Siegbert Gundacker, Reinach; Gerhard Badertscher, Bolligen, both of Switzerland

[73] Assignee: Plascon AG., Munchenstein, Switzerland

[22] Filed: Feb. 4, 1974

[21] Appl. No.: 439,468

[30]    Foreign Application Priority Data
        Mar. 9, 1973    Switzerland.......................... 3469/73

[52] U.S. Cl. .............. 219/286; 219/273; 219/295; 219/362; 338/86
[51] Int. Cl.².. H05B 1/02; H05B 3/60; H01C 10/02
[58] Field of Search .......................... 219/284–295, 219/271–276, 362; 338/80–86; 261/142

[56]            References Cited
               UNITED STATES PATENTS

| | | | |
|---|---|---|---|
| 2,185,786 | 1/1940 | Eaton.................................. | 219/286 |
| 3,269,364 | 8/1966 | Higgins........................... | 219/295 X |
| 3,629,550 | 12/1971 | Carlsson .........:................ | 219/273 X |
| 3,761,679 | 9/1973 | Dall ............................... | 219/295 X |
| 3,780,261 | 12/1973 | Eaton-Williams............ | 219/295 UX |

FOREIGN PATENTS OR APPLICATIONS
| | | | |
|---|---|---|---|
| 1,139,911 | 1/1969 | United Kingdom................. | 219/295 |

*Primary Examiner*—A. Bartis
*Attorney, Agent, or Firm*—Ladas, Parry, Von Gehr, Goldsmith & Deschamps

[57]            ABSTRACT

An improved method of operating a water-vapor generator having a vaporization vessel containing water and provided with heating electrodes therein which are connected to an electric current supply and between which flows an electric current whose magnitude depends on the depth of immersion of the electrodes in the water in the vessel, which method comprises discharging water from the vessel from time in order to reduce the concentration of minerals in the water resulting from vaporization and introducing fresh water into the vessel to replace that which has been evaporated and/or discharged. The method employs the electrode current as a controlled condition for the control of the water supply and discharge valves to the vessel. The magnitude of the electrode current is continuously measured, the course of variations in the measured current with respect to time between two limit valves, representing preselected minimum and maximum electrode current values, is compared with a predetermined set current course between the two limit values plotted in a Cartesian coordinate system with values of current as the ordinates and values of time as the abscissae and a quantity of water dependent upon the deviation of the measured current course from the predetermined set current course in discharged from the vessel.

10 Claims, 6 Drawing Figures

METHOD OF OPERATING AN ELECTRODE-TYPE WATER-VAPOR GENERATOR

The present invention relates to a method of producing water vapour, particularly for air humidification, wherein a vaporization vessel is used having electrodes which are connected to an electric supply line and through which there flows a current which is dependent on their depth of immersion in the water to be vaporized, present in the vessel, and so heats the water, wherein from time to time some of the water present in the vessel is cleared out in order to reduce the mineral concentration resulting during the vaporization, and fresh water is introduced into the vessel as required, instead of the water which has been vaporized and cleared out, and wherein the current flowing through the electrodes is utilized as a controlled condition to control the supply of water and the off-take of water.

The so-called electrode vaporizers hitherto known work on the following principle of operation. Tap water is introduced into the vaporization vessel, which is originally empty, so that an increasingly large surface area of the electrodes is wetted and a current begins to flow if the electrodes are connected to an electric supply line. In this case, the current density depends on the one hand on the conductance of the water and on the other hand on the height of the surface of the water in the vessel, that is to say on the depth of immersion of the electrodes. With filling to a certain height, depending on the quality of the water, a current will flow which corresponds to a predetermined vaporization capacity. The supply of water is now turned off and the water present in the vessel is allowed to vaporize partially. As a result, the water level drops and the current flowing through the electrodes, and hence also the vaporization capacity, decreases. This makes it necessary, after the vaporization capacity has dropped to a tolerable lower limiting value, to supply water again in order to raise the vaporization capacity again. Accordingly, however, the water level in the vessel oscillates about a mid-position which is the higher, the lower the conductivity of the water.

As a result of the constant vaporization of water, the concentration of the mineral salts dissolved in the water, that is to say the relative amount of the elements determining the conductance of the water, is increased. With each fresh inflow of water, therefore, the level which is necessary to achieve the required current density will be somewhat lower and after some introductions of fresh water it will be necessary to remove at least some of the "concentrated" water from the vessel, that is to say, to clear the non-vaporized residues out of the vessel. This in turn again causes a reduction in the conductivity, so that the filling height for reaching the required output rises again. It is known that the conductivity of tap water fluctuates within the range of about 1:10, depending on the geological conditions at the source. In addition, the conductivity of the water also fluctuates in the local mains system, for example as a result of interconnections, and with the change of seasons, particularly during prolonged dry or rainy periods. As a result, the conductivity varies within the range of about 1:2. These fluctuations in the conductivity of the fresh water have the effect that the filling height which is necessary to achieve a required vaporizer capacity is greatly dependent on the local and seasonal conditions. Because of these great differences in the conductance of the water, no vaporizing device could hitherto be produced which would have been equally suitable everywhere without special measures of constructional adaptation to the conditions at the utilization site and without tedious adjustment operations on site.

A vaporization device has already been proposed, wherein an automatic regulating device ensured that the supply of water was interrupted and a clearing out operation was initiated when the current flowing through the electrodes had reached a pre-selected maximum value corresponding substantially to the maximum vaporizer capacity. After the current had dropped to a lower limiting value as a result of the clearing out, the clearing-out operation could then be interrupted and fresh water supplied again. Vapour was produced continuously during these operations.

It is true that a substantially constant vaporization capacity could be achieved with this device, but at the expense of the energy balance. After all, a considerable amount of hot water was drawn off during each clearing-out phase. Now in order to check the heat losses somewhat, the clearing-out phase was later shortened, that is to say, after the vaporizer current had begun to drop, a certain amount of water was cleared out and then more was only vaporized until the lower limiting value for the current was established. Then fresh water was supplied again. Even with this method, however, a relatively large amount of heat was still wasted unless the vapour-generating equipment had been adapted to the local conditions in a tedious manner as a result of prolonged tests. The known vaporizing devices actually cause relatively high operating costs unless they are adapted to the conductivity of the fresh water. This relates, in particular, to the greatly shortened service life of electrodes and vaporization vessel if the water level does not lie within, or substantially within, the optimum range during the whole time of vapour production. It is therefore the object of the invention to propose a method of producing vapour which enables water vapour to be produced under optimum operating conditions, independently of the parameters varying during operation, such as the increasing scaling of the electrodes, for example, and the quality of water present at the utilization site, with a substantially constant vaporizaton capacity.

The above problem is solved, according to the invention, by a method of the kind defined at the beginning, which is characterised in that the flow of the current in time, which depends on the variation in the level of the water as a result of vaporization, supply of fresh water and off-take of water, is compared with a preset desired flow within a given range of current and, in the event of non-coincidence, an amount of water, which is constant or dependent on the deviation, is cleared out if the measured current flow, represented in a Cartesian coordinate system with a horizontal time axis, is above the desired flow represented in the same coordinate system when measured on an ascending leg of the current-time curve, or below it when measured on a descending leg. The preset desired flow is preferably a current-time curve which is found empirically and which produces the optimum operating conditions and economy for the vaporizing equipment in question.

The descending legs of the current curve are preferably used for the comparison thereof, in time, although the ascending legs of the current-time curve can be used with the same result.

According to a particularly advantageous form of execution of the method according to the invention, that empirically determined current-time curve which, with a conductance which is higher than the conductance of the water to be expected locally, provides the best possible results with regard to the whole economy, is selected as the desired flow in time for the electrode current.

As a characteristic descending leg of the current-time curve, one is preferably selected which results from a variation in level in the vaporization vessel caused only by the vaporization of water.

The period of time which the current needs to fall from a fixed higher to a fixed lower value, or the speed of fall at one or more regions between these values, may advantageously be used as reference criteria. It is also possible, however, to simulate the desired flow of the current electrically and to compare the desired value with the actual value of the current flowing through the electrodes, at a point of time within the preset range.

In order to carry out the method according to the invention, a vapour generator is proposed having a vaporization vessel which is provided with a feed pipe for fresh water and an outlet pipe for the water to be drawn off for the purpose of reducing the mineral concentration, a valve being disposed in each of the two pipes, and the vapour generator containing a regulating device for the supply of water to and the extraction of water from the vaporization vessel, which device serves to determine the current flowing through the electrodes. The vapour generator is characterised by a device for the comparison of the flow of current in time with a preset desired flow and a device for opening and closing said valves depending on the result of the comparison. The comparison device preferably comprises means which compare the speed at which the current falls from a higher to a lower value within a predetermined range, with the corresponding value of the desired flow.

According to another modification, the comparison device may comprise means which compare the period of time which the current needs to fall from a fixed higher to a fixed lower value, with the corresponding value of the desired flow.

Finally, it is also possible to provide the comparison device with means which simulate the desired flow of the current and compare the value of the current at a given moment with the value of the current actually flowing through the electrodes.

Four examples of embodiment of a vapour generator according to the invention are described in more detail below with reference to the drawing. In the drawing.

Figure 1:
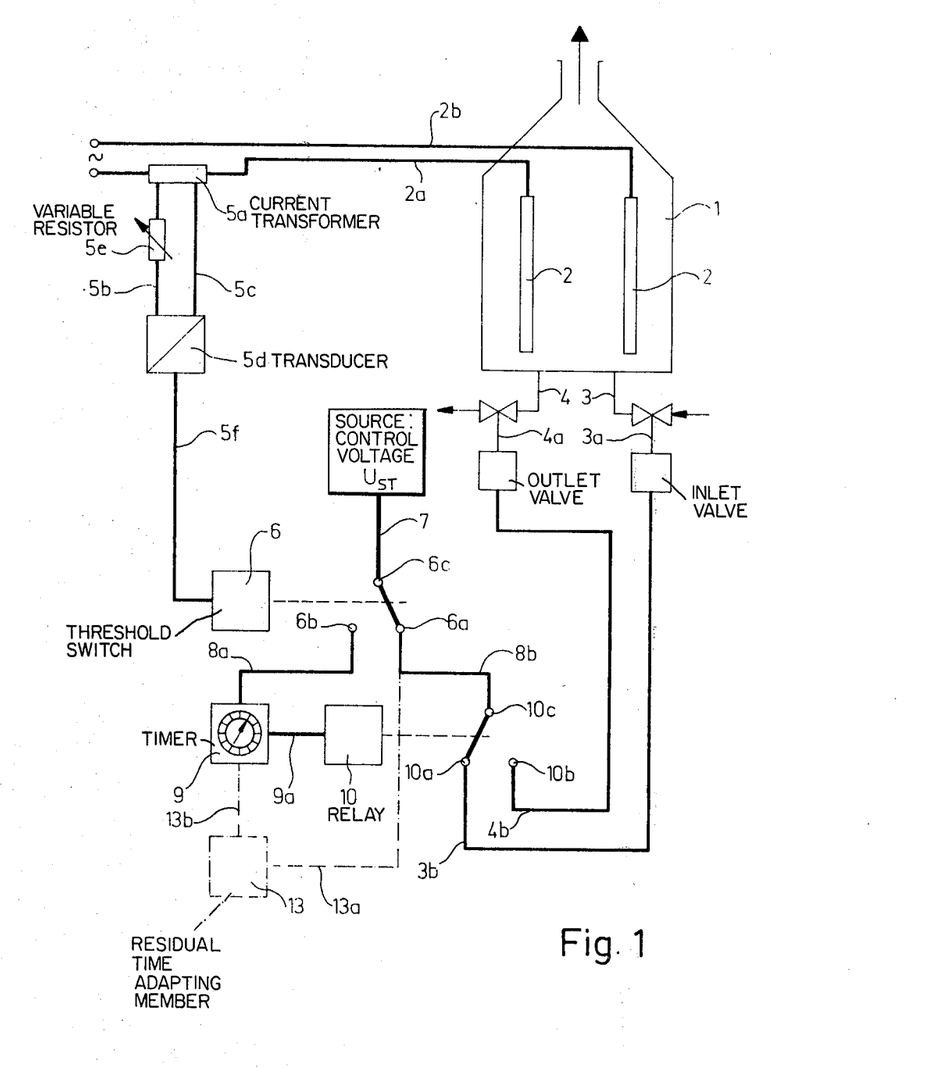
FIG. 1 shows a diagrammatic illustration of a first form of embodiment with proportional control.

According to FIG. 1, two vertical electrodes 2, parallel to one another, are disposed in a vaporization container 1. The electrodes and the vaporization container have a constant cross-section substantially over their entire length. The electrodes are each connected to a current supply line through a line 2a or 2b.

A fresh-water supply pipe 3 and a clearing-out pipe 4 lead into the container 1. An electrically operated valve 3a is disposed in the feed pipe 3 and an electrically operated valve 4a in the outlet pipe 4, the two electrically operated valves blocking the inflow or outflow of water in the absence of current.

In the line 2a there is a pick-off 5a which delivers an electrical signal corresponding to the electrode current. The pick-off may be a transformer or an electrical resistor.

The outputs of the pick-off 5a are connected, through two lines 5b and 5c, to the inputs of a transducer 5d which processes the signal into a control signal which is proportional to the electrode current. Together, the pick-off 5a and the transducer 5d form a measuring device for the current in the line 2a. A rheostat 5e in the input line 5b of the transducer 5d serves to regulate the magnitude of the control signal. Its arrangement at the point shown is one of several possibilities and is provided there purely by way of example.

The transducer 5d is connected, through a connection 5f, to the input of a threshold switch 6 which contains a changeover switch with the three contacts 6a, 6b and 6c.

The threshold switch 6 is constructed so that the movable contact of its changeover switch passes from the position illustrated into the other switching position when the control signal reaches or exceeds an upper limiting value fixed in the threshold switch, and switches back into its initial position illustrated when the control signal reaches from above or drops below a lower threshold value, which is likewise fixed. The maximum value of the control signal is determined by the setting of the rheostat 5e and corresponds to the maximum value of the current which should flow through the electrodes and thus is also a measure of the maximum value of the vaporizing capacity. Since the relationship between the electrode current and the magnitude of the control signal can be set by adjusting the rheostat 5e, the response values of the threshold switch can be adjusted over a wide capacity range of the vaporizer.

Attached to the movable contact 6c of the changeover switch is a control line 7, over which a starting instruction in the form of a control voltage $U_{ST}$, which sets the control in operation, can be applied. From the free contact 6b in the drawing, a line 8a leads to a timing element 9, which in turn is again connected, through a line 9a, to a relay 10. Like the threshold switch 6, the relay 10 comprises a changeover switch with a movable contact 10c and two fixed contacts 10a and 10b, the movable contact 10c being connected to the contact 6a through a line 8b. The fixed contacts 10a and 10b are each connected to the electrically operated valves 3a and 4a through a line 3b.

The timing element 9 is constructed in such a manner that, from the moment at which it receives the control voltage over the line 8a on, during a period of time which can be firmly set and which is hereinafter called the desired time, it energizes the relay, as a result of which its movable contact 10c passes from the position illustrated in the drawing into its other switching position. The response period of the relay 10 is not influenced even with continuous application of the control voltage to the timing element 9. After the expiration of the set period of time, the relay 10 is then deenergized again and the movable contact 10c returns to its initial switching position.

In order to obtain a more stable control characteristic of the whole arrangement, a device 13 may be connected to the contact 6a through a line 13a, which device is connected to the timing element 9 through a further line 13b and enables the lapse of desired time set at the timing element to be lengthened or shortened. The extent of the variation in the desired time is determined empirically for a specific type of vaporizer.

The mode of operation of the control circuit is described below and the method according to the invention explained at the same time.

As already mentioned, the magnitude of the current flowing through the electrodes depends essentially on the depth of immersion of the electrodes in the water and on the conductivity of the water to be vaporized. For a given vaporization capacity, which corresponds to a specific current density, the depth of immersion will thus be inversely proportional to the conductance of the water in question.

It is now assumed that the vessel is filled with water up to a level which corresponds to a given vaporization capacity. As a result of the current which now flows, water is vaporized, which naturally leads to a sinking of the water level. As the water level drops, however, the current density also drops, so that less water is vaporized and accordingly the water level also drops more slowly in the vessel. On the basis of simple physical considerations, it can be shown that, starting from a maximum value corresponding to the maximum vaporization capacity, the current flowing through the electrodes tends towards zero in accordance with an exponential function, if the simplifying assumption is postulated that the conductivity of the water in the vessel remains constant. This condition is naturally not fulfilled in reality but this has practically no influence on the utility of the following considerations.

As is to be expected, the slope of the exponential curve is the greater, the higher the initial conductivity of the water to be vaporized. On the other hand, it is easy to see, from the exponential connection between current density and vaporization time, that the same period of time is always needed for the current to drop from a specific value to a value which is lower by a fixed percentage, and it does not matter in which range this current value happens to lie. Thus, during the vaporization operation, regardless of its absolute value, the current flowing through the electrodes always needs the same period of time in order to decline to a value which is lower by a fixed proportion, this period of time being the shorter, the higher the conductivity of the water to be vaporized. If the flow of the current is entered depending on time in a single logarithmic coordinate system, then a straight line is obtained having a negative slope, the inclination of the straight line becoming greater as the conductivity of the water to be vaporized increases. If a specific relationship between an upper current value (hereinafter called "maximum value" in accordance with the method of designation selected above) and a lower current value (hereinafter called "threshold value") is assumed in this representation, then the slope of the straight line represents the dropping speed of the logarithm of the current and is a measure of the conductivity of the water. On the other hand, the dropping time and dropping speed are interdependent quantities so that the former also represents a measure of the conductivity of the water. For the operation of the vaporizing device described above, the desired time is now set at the timing element 9 so that it corresponds to the period of time which the current needs to drop from the "maximum value" to the "threshold value" if water having a conductivity, the value of which is higher than the highest fresh-water conductivity to be expected locally, is present in the vessel. It is further presupposed that the relative variation in current between the "maximum value" and the "threshold value," which values correspond to the response values of the threshold switch, is given as a system constant.

A control voltage $U_{ST}$ is now applied, over the line 7, to the contact 6c of the changeover switch in the threshold switch 6. With the switching position illustrated in the drawing, the control voltage now appears at the electrically operated valve 3a in the fresh-water supply pipe 3 and opens this, so that water flows into the vessel 1 and the level begins to rise. Thus a current begins to flow in the lines 2a and 2b. When the water now reaches the level at which the maximum current $I_{max}$ preset by the rheostat 5e flows, the threshold switch 6 responds, as a result of which the line 7 is now connected to the line 8a. The electrically operated valve 3a is thus without current and interrupts the supply of water to the vessel, while the control voltage now appears at the timing element 9 and starts the lapse of the desired time. This leads to the response of the relay 10, which brings its changeover switch into the switching position in which the line 8b is connected to the line 4b.

Figure 3:
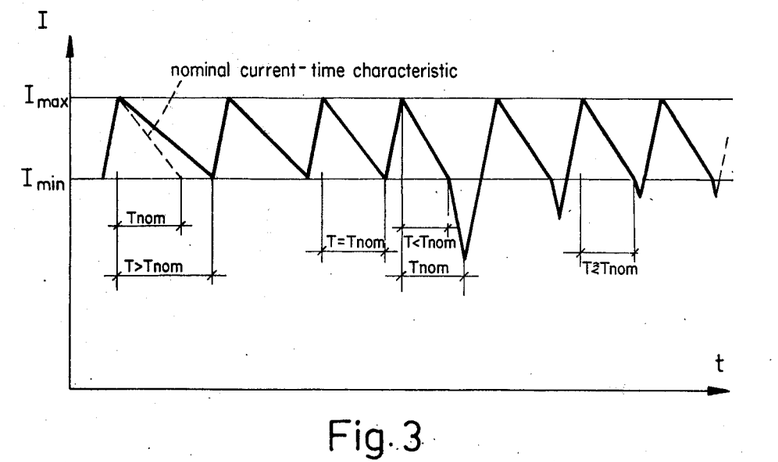
FIG. 3 shows the course of the current flowing through the electrodes in a circuit as shown in FIG. 1, as depending on time, and on a logarithmic scale.

Because of the vapour production which now takes place, the current drops and this generally takes longer than the desired time $T_{nom}$ to reach the threshold value designated by $I_{min}$ in FIG. 3 because, by hypothesis, the desired time corresponds to a higher conductance than the highest to be expected. Thus the relay 10 and its changeover contact 10c will return to their initial position before the threshold switch 6, so that when the threshold value $I_{min}$ is reached, the control voltage reappears at the valve in the feed pipe 3 and fresh water is again supplied until the current has risen to its maximum value. After this, the switching sequence referred as the first cycle begins from the beginning. FIG. 3 shows this with reference to a diagrammatic current-time curve. Now, since the concentration of the non-volatile minerals in the water increases to an ever greater extent as the number of cycles progresses, the case will ultimately occur when the dropping time T is shorter than the preset desired time $T_{nom}$. The switching sequence termed the second cycle is then initiated and takes place as follows.

After the maximum value of the current has been reached, the contacts of the threshold switch change over. If the dropping time T is shorter than the desired time $T_{nom}$, then the threshold switch 6 immediately returns to its normal position, while the changeover contact 10c of the relay 10 is still connected to the fixed contact 10b. This state remains in existence until the desired time $T_{nom}$ has expired. In the meantime, that is to say from the moment the threshold switch 6 switches back until the expiration of the desired time, the control voltage $U_{ST}$ appears at the electrically operated valve 4a in the clearing-out pipe 4, as a result of which this valve opens and water is let out of the vaporizing vessel. After expiration of the desired time, the relay 10 also switches back so that now the control voltage $U_{ST}$ is no longer applied to the valve 4a in the clearing-out pipe but to the valve 3a in the fresh-water supply pipe 3. The replenishment cycle now begins again from the beginning.

A reduction in the conductivity of the water present in the vessel results from the clearing out and subsequent replenishment with fresh tap water so that, only after a few replenishment cycles does its conductivity again approach that value on which the desired time is based.

According to whether the conductance of the water present in the vessel, is above or below the desired conductance specified indirectly by the timing element, the switching sequence designated above as the second or the first cycle is executed automatically from now on. In the course of this, after a starting phase lasting some cycles, the conductance of the water is adjusted to an actual conductance close to the desired conductance and, according to experience, hunts about this value within very narrow limits as is typical in a proportional control operation. The remaining deviation from the desired value is no longer of importance in practice. It can be influenced by a device 13, which is shown in chain line in FIG. 1 and which is connected to the timing element and can alter the duration of the desired time. It only acts, however, from the moment on, at which the current reaches the threshold value and so the threshold switch has again switched over into its initial position.

The shortening of the desired time leads to a shortening of the interim mentioned earlier and means an increase in the proportional control range, which in turn prevents the control action for the conductance from having an excessively oscillatory character and being constantly regulated below and above the desired conductance. This measure could also be termed a kind of damping.

The vapour generator shown in FIG. 2 comprises essentially the same elements as described with reference to FIG. 1, for which reason, like parts are designated by like reference numerals.

The difference lies essentially in the fact that here a so-called on-off control is realized, which necessitates some alterations in circuit organization. In addition to the parts designated by 1 to 10, this device comprises a second threshold switch 11, which cooperates with the measuring device for the current and has three contacts 11a, 11b and 11c, a device 12b cooperating with the relay 10 to lock the relay 10 in its operating position, and a device 12a to cancel this locking. The movable contact 11c of the second threshold switch 11 is connected, through a line 11d, to the line 4b, to the electrically operated valve 4a in the clearing-out pipe 4, while the locking device 12b is connected to the fixed contact 11b, and the device 12a for cancelling the locking is connected to the fixed contact 11a of the threshold switch 11.

Figure 4:
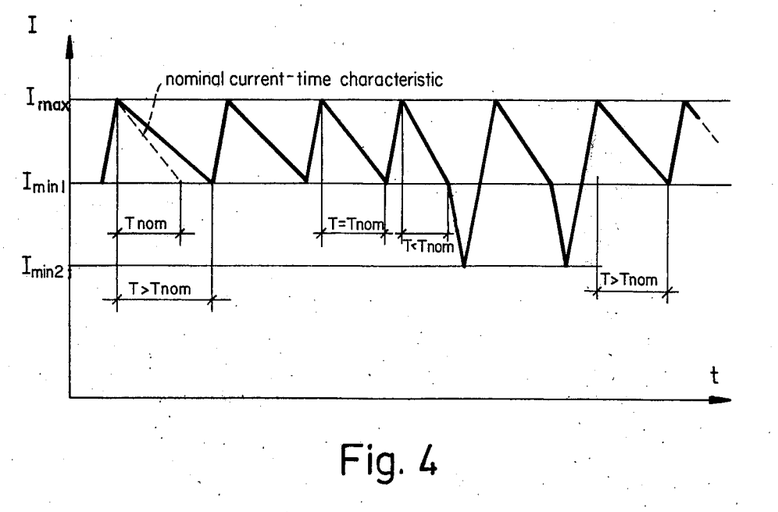
FIG. 4 shows the current-time curve in the circuit as shown in FIG. 2, illustrated in the same manner as in FIG. 3.

The sequence of operations with this modified embodiment is illustrated diagrammatically in FIG. 4 and is identical with that of the modification described with reference to FIG. 1, so long as the conductivity of the water in the vessel is below the preset desired conductance.

The second threshold switch 11 has two operating points, of which the upper one coincides with the maximum value of the current and the lower one corresponds to a lower limiting value $I_{min\ 2}$ of the current through the electrodes, which is lower than the threshold value. When the maximum value is reached, the threshold switch 11 switches over from its switching position illustrated into the other one, while it switches back as soon as the current has reached the lower limiting value.

Now when the conductance of the water rises with increasing mineral concentration, the case will soon occur where the actual dropping time T of the current is shorter than the desired time $T_{nom}$. Then the first threshold switch 6 switches back before the relay 10 and the control voltage now opens the valve in the clearing-out pipe. At the same time, the locking device 12b is excited through the line 11d and the second threshold switch 11. As a result, the relay 10 is prevented from being able to switch back immediately after the expiration of the desired time $T_{nom}$.

Thus water flows continuously out of the vessel 1 as a result of which the current drops further. When the current has now dropped to its lower limiting value, the threshold switch 11 switches over and applies the control voltage to the device 12a. This causes cancelling of the locking of the relay 10 and then its restoration to the initial position. A switching position has now been reached, however, in which the control voltage again appears at the valve 3a in the fresh-water supply pipe 3, so that the whole thing can begin again from the beginning. Depending on the instantaneous conductance of the water in the container, the first or the second cycle is executed, the cycle designation coinciding with that in the first example of an embodiment. FIG. 4 shows a graphic current-time representation relating to this.

In the two examples of embodiment described above, a descending leg in the current-time graph has been utilized for the comparison of the course in time of the current flowing through the electrodes with the desired course. Obviously, it would also be possible to determine the speed of the current rise, for example during the replenishment with fresh water, and to utilize it accordingly for the control of the two electrically operated valves.

As already stated above, the mean level of the water in the vaporization vessel depends mainly on its conductivity. Now it is easy to see that a very specific quality of water is necessary for a specific type of vapour generator, in order that it may be able to work under optimum conditions. Optimum is here understood to mean primarily the economy, with power requirements, maintenance costs and wear of material on the expense side.

The most favourable water conductivity for a specific type of vapour generator can be determined by series of tests. For this conductivity, there is then a typical course of the vaporizing current in time, however, which is characteristic of these optimum conditions and represents the desired flow. In general, the section in a current-time diagram in which the current drops from an upper to a lower value as a result of the progressive vaporization of the water present in the vessel, is of greater interest and more significant importance than a section in which the current rises from a lower value to the maximum value, which is why the first-mentioned section is also generally used for the comparison. As has already been explained fully in the above examples, the period of time which the current needs to drop from a higher to a lower value can be used to advantage for the comparison of the desired flow of current with the actual flow of current. As is shown by the following examples, however, the dropping speed of the current may also be compared with the preset desired flow or even the current values may be compared directly, for the decision as to whether clearing out should be effected or not.

As is clear from the above statements, a particular advantage of the method according to the invention lies in the fact that it can work completely independently of the quality of water to be found at the place where the vapour generator is used. It is actually possible, by simple constructional measures, to ensure that the water conductivity which is optimum for the particular type of vapour generator is much higher than the highest local conductivity of the water in question for the vaporizing plant. Therefore, a vapour generator working by the method according to the invention can be used for any quality of water without any re-adjustment having to be made thereto. It then adjusts itself automatically to the optimum operating condition, in that it "concentrates" the water to be vaporized until it substantially reaches the optimum conductivity.

Figure 2:
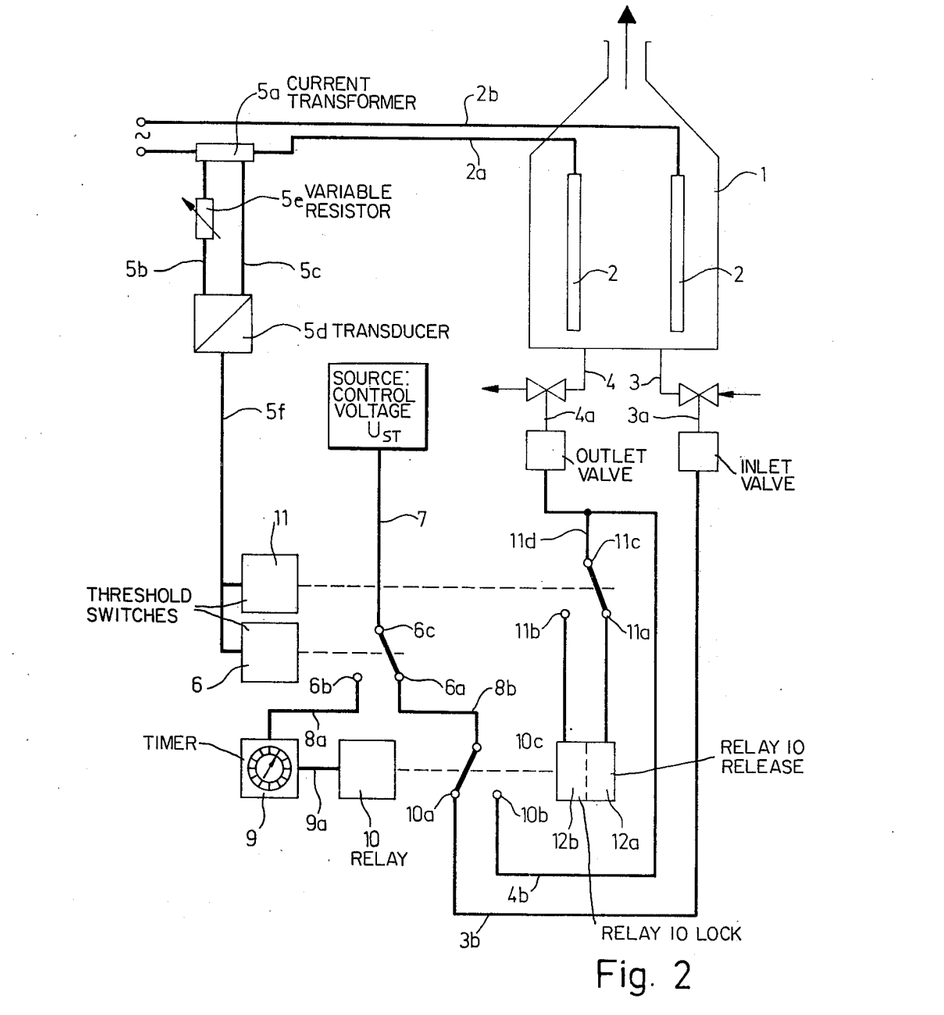
FIG. 2 shows a diagrammatic illustration of a second form of embodiment but with on-off control.
Figure 5:
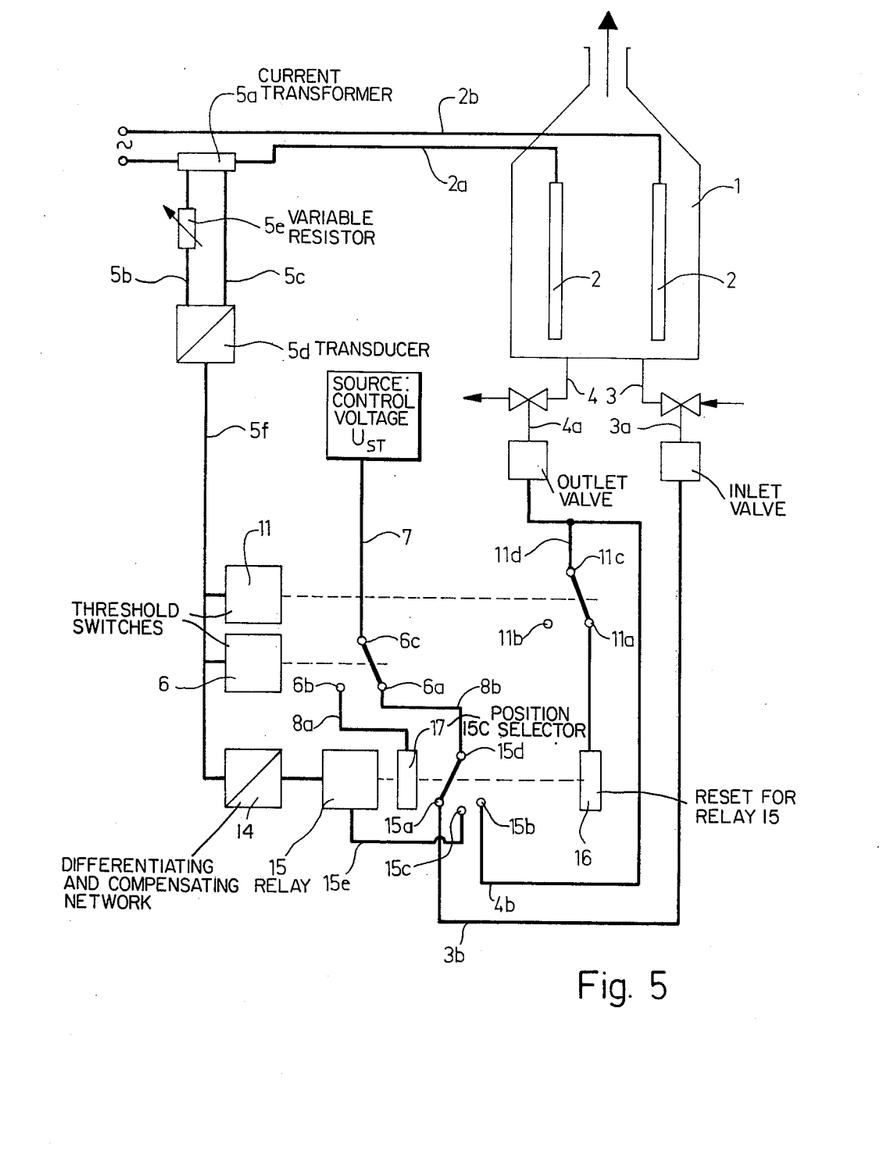
FIG. 5 shows a diagrammatic illustration of a third.

The example of an embodiment of a vapour generator according to the invention, illustrated in FIG. 5, has a certain similarity to the example of an embodiment as shown in FIG. 2, for which reason like parts are here, too, designated by the same reference numerals.

The difference in comparison with the forms of embodiment shown in FIGS. 1 and 2 consists essentially in the absence of the timing element 9 and the alterations in circuit organization caused as a result. Instead, the vapour generator comprises a differentiating-comparison network 14, which is connected to the output 5f of the transducer 5d. It can produce an output signal which corresponds to the value di/dt for the current instantaneously flowing through the electrodes and compare it with a signal, the magnitude of which corresponds to the desired value. According to the result of this comparison, the differentiating-comparison network 14 delivers an output signal which serves to control a relay 15 having three different switching positions 15a, 15b and 15c, which are controlled according to the result of the comparison. The movable contact 15d of the changeover contact bank at the relay 15 is connected, through a line 8b, in accordance with FIG. 2, to the contact 6a of the threshold switch 6, while the contacts 15a and 15b are connected, in a similar manner, through the lines 3b, 4b, to the valves 3a, 4a. The contact 15c, which is actuated in the centre switching position of the relay 15, is connected, through a line 15e, to the operating coil of the relay 15 in such a manner that this can only execute a further switching movement when the control voltage $U_{ST}$ is applied to the contact 15c.

Two devices are coupled to the relay 15: A restoring mechanism 16 and a device 17 which brings the changeover switch of the relay 15 into its mid position 15c. The restoring mechanism 16 causes the changeover switch to be restored from the switching position 15b into the switching position 15a and, like the device 12a cancelling the locking in FIG. 2, is connected to the changeover contact 11a of the second threshold switch 11. The device 17 receives its control signal through the contact 6b of the first threshold switch 6.

The device described above has the following mode of operation. When the current flowing through the electrodes reaches its maximum value, the threshold switch 6 changes over so that the control voltage is no longer applied to the inlet valve 3a through 6a, 8b, 15d, 15a and 3b but now, through the contact 6b, actuates the device 17 which brings the changeover contact of the relay 15 into its mid switching position 15c.

Meanwhile, water is vaporized in the vaporizer, as a result of which the current drops and, in due course, causes the threshold switch 6 to switch back into its initial position 6a. As a result, however, the control voltage $U_{ST}$ is now applied, through 6a, 8b, 15d, 15c and 15e, to the relay 15 so that this can switch over either into the switching position 15a or 15b. The direction of switching over depends on the result of the comparison of the differential quotient di/dt with its desired value by the differential-comparison network 14. If the instantaneous value of the differential quotient is lower than the value resulting from the desired flow, then the relay switches back into the position 15a, as a result of which the inlet valve 3a is fed and fresh water can be supplied. If the differential quotient is higher than its desired value, however, then the relay 15 jumps into its switching position 15b, as a result of which the outlet valve 4a receives voltage and water is let out. After the current has dropped, as a result, to a lower current value, termed limiting value, the second threshold switch 11 jumps back into its switching position 11a, from which it had switched over into the position 11b when the maximum current value was reached, and as a result applies a control signal to the restoring mechanism 16 which re-establishes the original state of the circuit, illustrated in the drawing. A new cycle can now begin by supplying fresh water.

Figure 6:
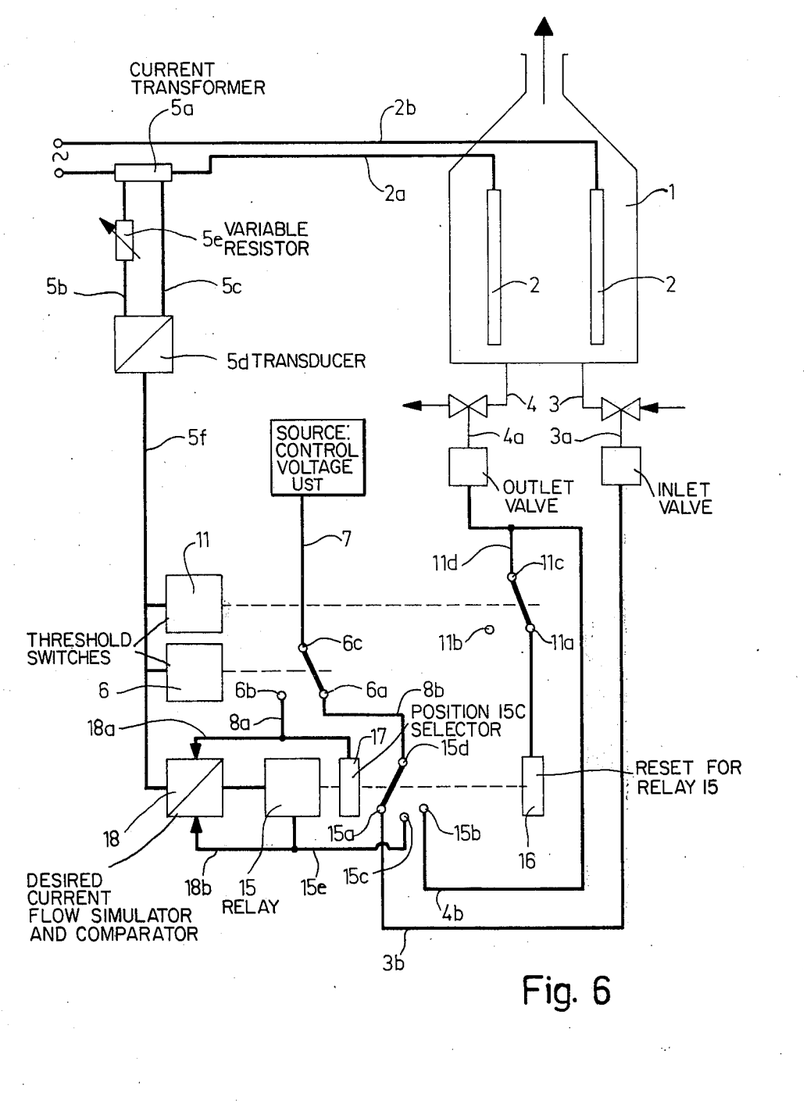
FIG. 6 shows a diagrammatic illustration of a fourth form of embodiment.

The example of an embodiment illustrated in FIG. 6 differs from that according to FIG. 5 by a desired-flow simulator 18, which replaces the differentiating-comparison network 14.

The desired-flow simulator 18 is an electrical device which represents the desired flow of the electrode current by a voltage varying in time. In view of the fact that the descending leg of such a current-time curve to be considered in the present case approximately follows an exponential function, the desired flow can easily be represented by a capacitor discharge for example.

The simulator 18 contains a comparison element which, at a specific moment selected by a trigger signal, compares the instantaneous current value with the simulated value.

When the threshold switch 6 switches over when the maximum current value is reached, the simulator 18 receives a starting pulse over a line 18a. This initiates the simulation operation. All the other switching operations correspond completely to those in the example of an embodiment shown in FIG. 5.

When the electrode current has dropped sufficiently, the threshold switch 6 switches back so that the control voltage $U_{ST}$ is now applied to the simulator over the line 15e and 18b. As a result, this is caused to compare the instantaneous current density with the simulated value, and to produce a control signal for the relay 15, depending on the result of the comparison. If the actual value of the current is above the simulated desired value, then the relay switches back into its initial position, while, in the other case, it jumps into the switching position 15b and initiates the clearing-out operation as a result. All further steps correspond to those in the example of an embodiment shown in FIG. 5.

Naturally, the two vapour generators described last could also be equipped with elements for proportional control. Since such a circuit design is clear to one skilled in the art, from the above explanations, a description of an example will be dispensed with.

However the specific construction of the vapour generator is selected, the only important thing is that the conductivity of the water present in the vessel, represented by the current flow in time, is measured by one of the criteria indicated above, compared with a desired value and the result of the comparison used to adjust the conductivity to the optimum value determined empirically.

Vapour generators of the kind described can be operated extremely economically by means of the method according to the invention. Vapour generators working by the method do not need to be adjusted to the particular conductance of the feed water at the place where they are used. Thus the same device can be used for any water conductance coming within the usual range.

Furthermore, the method according to the invention may also be used, in an appropriate modification, for those cases where only so-called fully demineralized water may be used for the production of vapour.

There a small amount of an electrolyte is then added to the water to be vaporized, in order to make it conductive at all. After the claring out, the supply of fresh electrolyte can be effected by appropriate extension of the control program.

We claim:

1. An improved method of operating a water-vapor generator comprising a vaporization vessel containing water and having electrodes which are connected to a current supply and between which flows a current whose magnitude depends on the depth of immersion of the electrodes in the water in the vessel, the method comprising discharging water from the vessel from time to time in order to reduce the concentration of minerals resulting from the vaporization, introducing fresh water into the vessel in order to replace water that has been evaporated and discharged, and employing the electrode current as a controlled condition for the control of supply of water and discharge of water, the improvement consisting in continuously measuring the magnitude of the electrode current, comparing the course of variations in the measured current with respect to time from a preselected maximum electrode current to a preselected minimum electrode current, which maximum and minimum electrode currents depend upon a desired mean rate of generation of water vapor, with a predetermined set course from the maximum electrode current to the minimum electrode current, and in the event that the measured course of variations lies beneath the predetermined set course, when plotted in a Cartesian coordinate system with values of current as ordinates and values of time as abscissae, discharging from the vessel a quantity of water dependent upon the deviation of the measured course from the predetermined set course.

2. A method as claimed in claim 1, wherein the predetermined set course is an empirically determined course of variations in current with respect to time that would result from employing water having an electrical conductivity which is higher than the electrical conductivity of the local water supply.

3. A method as claimed in claim 2, wherein the predetermined set course of variations in current with respect to time takes account only of reduction in the depth of immersion of the electrodes in the water due to vaporization.

4. A method as claimed in claim 3, wherein the comparison takes place during the time interval when the electrode current falls from a predetermined high value to a predetermined low value.

5. A method as claimed in claim 3, wherein the rate at which the current falls within a preterminted range is employed for the comparison of the measured course with the predetermined set course.

6. The method as claimed in claim 1, wherein the water-vapor generator as claimed in claim 1, comprises a vaporization vessel provided with first and second electrodes and with an inlet for fresh water and an outlet for discharging water in order to reduce the concentration of minerals, an inlet valve arranged to control flow of water through the inlet, an outlet valve arranged to control flow of water through the outlet, a regulation device connected to measure current flowing between the electrodes, comparison means connected to the regulation device to compare the course of variations in current with respect to time with a predetermined set course, and a control device connected to the comparison means and the outlet valve to open and close that valve in dependence upon the comparison result, the outlet valve being opened when the time interval taken by the current to fall from a preselected high value to a preselected low value is shorter than the time interval derived from the predetermined set course, and remaining open during a time interval which corresponds to a predetermined proportion of the difference between the actual time interval and the time interval derived from the predetermined set course.

7. A method as claimed in claim 6, wherein the comparison means include means to determine the rate at which the electrode current falls within the predetermined range.

8. An improved method of operating a water-vapor generator comprising a vaporization vessel containing water and having electrodes which are connected to a current supply and between which flows a current whose magnitude depends on the depth of immersion of the electrodes in the water in the vessel, the method comprising discharging water from the vessel from time to time in order to reduce the concentration of minerals resulting from the vaporization, introducing fresh water into the vessel in order to replace water that has been evaporated and discharged, and employing the electrode current as a controlled condition for the control of supply of water and discharge of water, the improvement consisting in continuously measuring the magnitude of the electrode current, comparing the course of variations in the measured current with respect to time from a preselected minimum electrode current to a predetermined maximum electrode current, which minimum and maximum electrode currents depend upon a desired mean rate of generation of water vapor, with a predetermined set course from the minimum electrode current to the maximum electrode current, and in the event that the measured course of variations lies above the predetermined set course, when plotted in a Cartesian coordinate system with values of current as ordinates and values of time as abscissae, discharging from the vessel a quantity of water dependent upon the deviation of the measured course from the predetermined set course.

9. A method of operating a water-vapor generator comprising a vaporization vessel having an inlet valve for admitting water to the vessel, an outlet valve for discharging water from the vessel, and electrodes which are connected to a current supply and between which flows a current whose magnitude depends on the depth of immersion of the electrodes in the water in the vessel, the method comprising opening the inlet valve to introduce water into the vessel until the electrode current reaches a preselected maximum value, comparing the time taken by the electrode current to fall from the preselected maximum value to a preselected minimum value with a predetermined set time and, in the event that the measured time expires after the set time, opening the inlet valve to introduce further water into the vessel until the electrode current reaches the preselected maximum value once more or, in the event that the measured time expires before the set time, opening the outlet valve, to discharge water from the vessel, until expiration of the set time, and so on.

10. A improved method of operating a water-vapor generator comprising a vaporization vessel containing water and having electrodes which are connected to a current supply and between which flows a current whose magnitude depends on the depth of immersion of the electrodes in the water in the vessel, the method comprising discharging water from the vessel from time to time in order to reduce the concentration of minerals resulting from the vaporization, introducing fresh water into the vessel in order to replace water that has been evaporated and discharged, and employing the electrode current as a controlled condition for the control of supply of water and discharge of water, the improvement consisting in continuously measuring the magnitude of the electrode current, comparing the course of variations in the measured current with respect to time between two limit values, one of which is a preselected maximum electrode current and the other which is a preselected minimum electrode current, with a predetermined set course between the two limit values plotted in a Cartesian coordinate system with values of current as ordinates and values of time as abscissae, and discharging from the vessel a quantity of water dependent upon the deviation of the measured course from the predetermined set course.

* * * * *